United States Patent
Yagishita et al.

(10) Patent No.: US 11,458,921 B2
(45) Date of Patent: Oct. 4, 2022

(54) INSTRUMENT PANEL

(71) Applicants: TOYOTA JIDOSHA KABUSHIKI KAISHA, Toyota (JP); SUBARU CORPORATION, Tokyo (JP)

(72) Inventors: Yuichi Yagishita, Toyota (JP); Masayuki Tado, Toyota (JP); Ken Tanaka, Aichi-gun (JP); Satoshi Inuzuka, Toyota (JP)

(73) Assignees: Toyota Jidosha Kabushiki Kaisha, Toyota (JP); Subaru Corporation, Tokyo (JP)

( * ) Notice: Subject to any disclaimer, the term of this patent is extended or adjusted under 35 U.S.C. 154(b) by 0 days.

(21) Appl. No.: 17/374,056

(22) Filed: Jul. 13, 2021

(65) Prior Publication Data
US 2022/0055565 A1 Feb. 24, 2022

(30) Foreign Application Priority Data
Aug. 20, 2020 (JP) .............................. JP2020-139501

(51) Int. Cl.
*B60R 21/205* (2011.01)
*B60R 21/215* (2011.01)

(52) U.S. Cl.
CPC .......... *B60R 21/205* (2013.01); *B60R 21/215* (2013.01)

(58) Field of Classification Search
CPC . B60R 21/205; B60R 21/215; B60R 21/2165; B60R 21/21506; B60R 21/21543; B60R 2011/0005; B60R 13/0256; B60R 13/005; B60K 37/00; B60K 37/04
See application file for complete search history.

(56) References Cited

U.S. PATENT DOCUMENTS

| | | | | |
|---|---|---|---|---|
| 6,135,489 | A * | 10/2000 | Bowers | B60R 21/2165 280/731 |
| 6,443,484 | B2 * | 9/2002 | Anglsperger | B60R 21/21656 280/728.3 |
| 6,695,344 | B2 * | 2/2004 | Hauer | B60R 21/21656 280/731 |
| 7,766,371 | B2 * | 8/2010 | Fujimori | B60R 21/21656 280/731 |
| 8,333,405 | B2 * | 12/2012 | Cesaretti | B60R 21/2165 280/728.3 |
| 2019/0351860 | A1 * | 11/2019 | Oh | B60Q 3/20 |
| 2021/0061189 | A1 * | 3/2021 | Fujimori | B60R 13/005 |

FOREIGN PATENT DOCUMENTS

| JP | 2014-113883 A | 6/2014 |
|---|---|---|
| JP | 2017-210230 A | 11/2017 |

* cited by examiner

*Primary Examiner* — James A English
*Assistant Examiner* — Tiffany L Webb
(74) *Attorney, Agent, or Firm* — Finnegan, Henderson, Farabow, Garrett & Dunner, LLP

(57) ABSTRACT

An instrument panel mounted on a vehicle and covering an airbag may include: a panel body including a first slit at a position opposing the airbag; a decorative sheet constituted of at least one of cloth and leather, the decorative sheet covering an area of the panel body including the first slit, and the decorative sheet including at least one second slit arranged along the first slit; and a fastener fastening the decorative sheet on the panel body. The fastener may include: a cover plate covering the at least one second slit; and at least one anchor extending from a back surface of the cover plate and passing through the first slit and the at least one second slit, the at least one anchor being fixed to the panel body.

4 Claims, 5 Drawing Sheets

INSTRUMENT PANEL

CROSS-REFERENCE TO RELATED APPLICATION

This application claims priority to Japanese Patent Application No. 2020-139501 filed on Aug. 20, 2020, the contents of which are hereby incorporated by reference into the present application.

TECHNICAL FIELD

The technique disclosed herein relates to an instrument panel mounted on a vehicle and covering an airbag.

Japanese Patent Application Publications Nos. 2017-210230 and 2014-113883 describe an instrument panel in which a decorative sheet constituted of leather or cloth is attached on a surface of a panel body of the instrument panel. An airbag is disposed inside the instrument panel. The panel body includes a slit at a position opposing the airbag. When pressed by inflation of the airbag, the panel body is split along the slit. By including the slit, the airbag smoothly inflates. The decorative sheet constituted of leather or cloth may also include a slit so as not to interfere with the inflation of the airbag (for example, Japanese Patent Application Publication No. 2017-210230).

Including the slit in the decorative sheet constituted of leather or cloth may degrade appearance of the decorative sheet. The present disclosure provides a technique to fasten a decorative sheet constituted of leather or cloth on a panel body without the decorative sheet interfering with inflation of an airbag or without degrading its appearance.

The disclosure herein discloses an instrument panel mounted on a vehicle and covering an airbag. The instrument panel may comprise: a panel body including a first slit at a position opposing the airbag; a decorative sheet constituted of at least one of cloth and leather, the decorative sheet covering the first slit. The decorative sheet may include at least one second slit arranged along the first slit. The instrument panel disclosed herein may comprise a fastener. The fastener may comprise: a cover plate covering the at least one second slit; and at least one anchor extending from a back surface of the cover plate. The at least one anchor may pass through the first slit and the at least one second slits and is fixed to the panel body. The at least one anchor (fastener) may fasten the decorative sheet on the panel body.

In the instrument panel disclosed herein, the decorative sheet includes the at least one second slit, and the fastener covers the at least one second slit. The at least one second slit of the decorative sheet is covered by the fastener, by which appearance of the decorative sheet is not degraded. In addition, when pressed by inflation of the airbag, the decorative sheet is split along the at least one second slit. The decorative sheet does not interfere with the inflation of the airbag. When the panel body and the decorative sheet are split along the first slit and the at least one second slit respectively, the fastener is detached as well. The fastener does not interfere with the inflation of the airbag either. Since the cover plate of the fastener presses the decorative sheet onto the panel body, loosening of the decorative sheet is also prevented.

Details and further improvements of the technique disclosed herein will be described in Detailed Description below.

DETAILED DESCRIPTION

Figure 1:
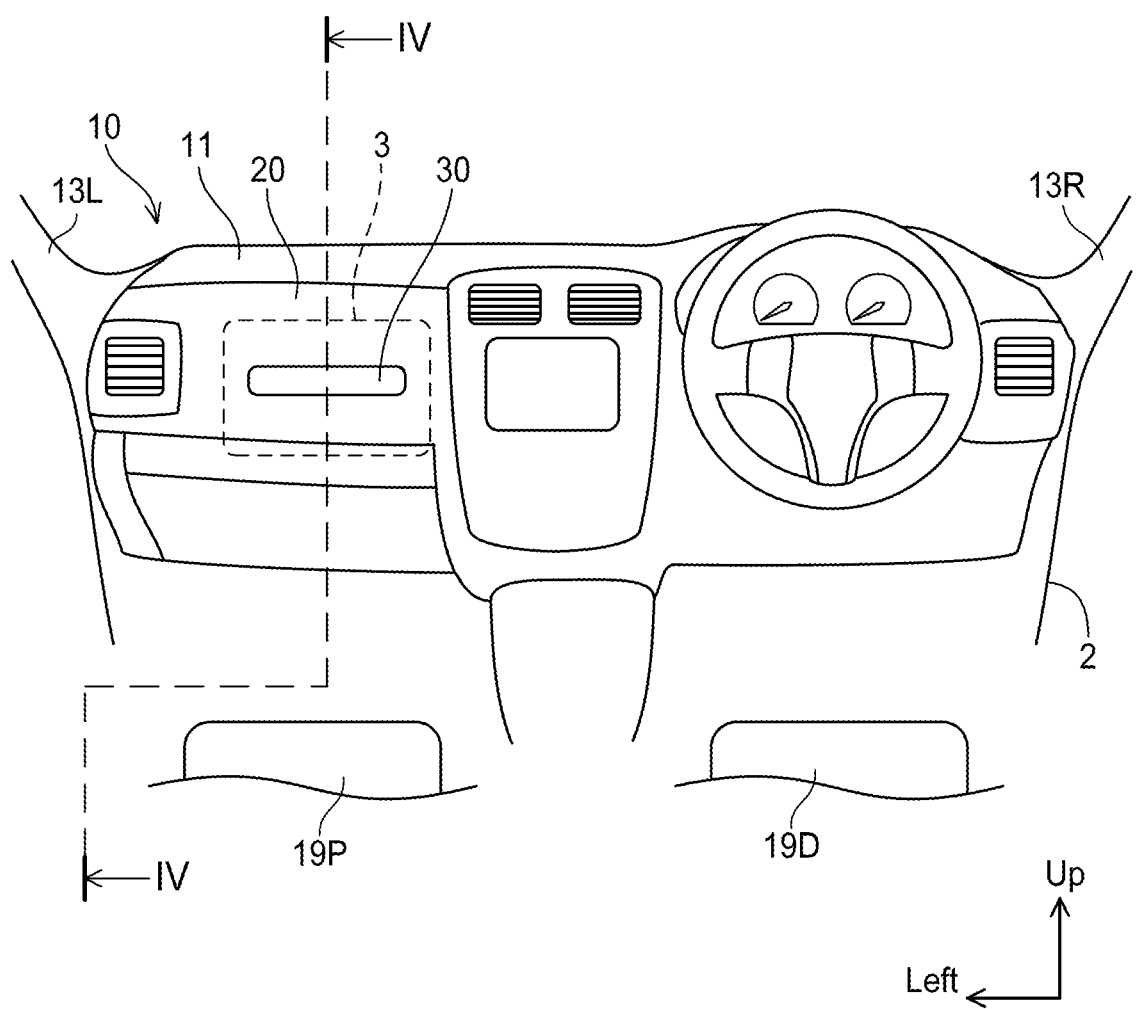
FIG. 1 illustrates a front view of an instrument panel.

An instrument panel 10 of an embodiment will be described with reference to the drawings. FIG. 1 illustrates a front view of the instrument panel 10. The instrument panel 10 is an interior component disposed below a windshield of the vehicle 2 and frontward of a driver seat 19D and a front passenger seat 19P. In a narrow meaning, "instrument panel" refers to a display unit frontward of the driver seat 19D and a cover supporting switches. The term "instrument panel" in the present disclosure has a broader meaning, and refers to the interior component extending from a right front pillar 13R to a left front pillar 13L of the vehicle 2 and disposed frontward of the driver seat 19D and the front passenger seat 19P. "Instrument panel" may be termed as "dashboard".

The instrument panel 10 includes a panel body 11 constituted of resin, a decorative sheet 20 covering the panel body 11, and a fastener 30 fastening the decorative sheet 20 on the panel body 11. The decorative sheet 20 partially covers the panel body 11 on a front side of the front passenger seat 19P.

Figure 2:
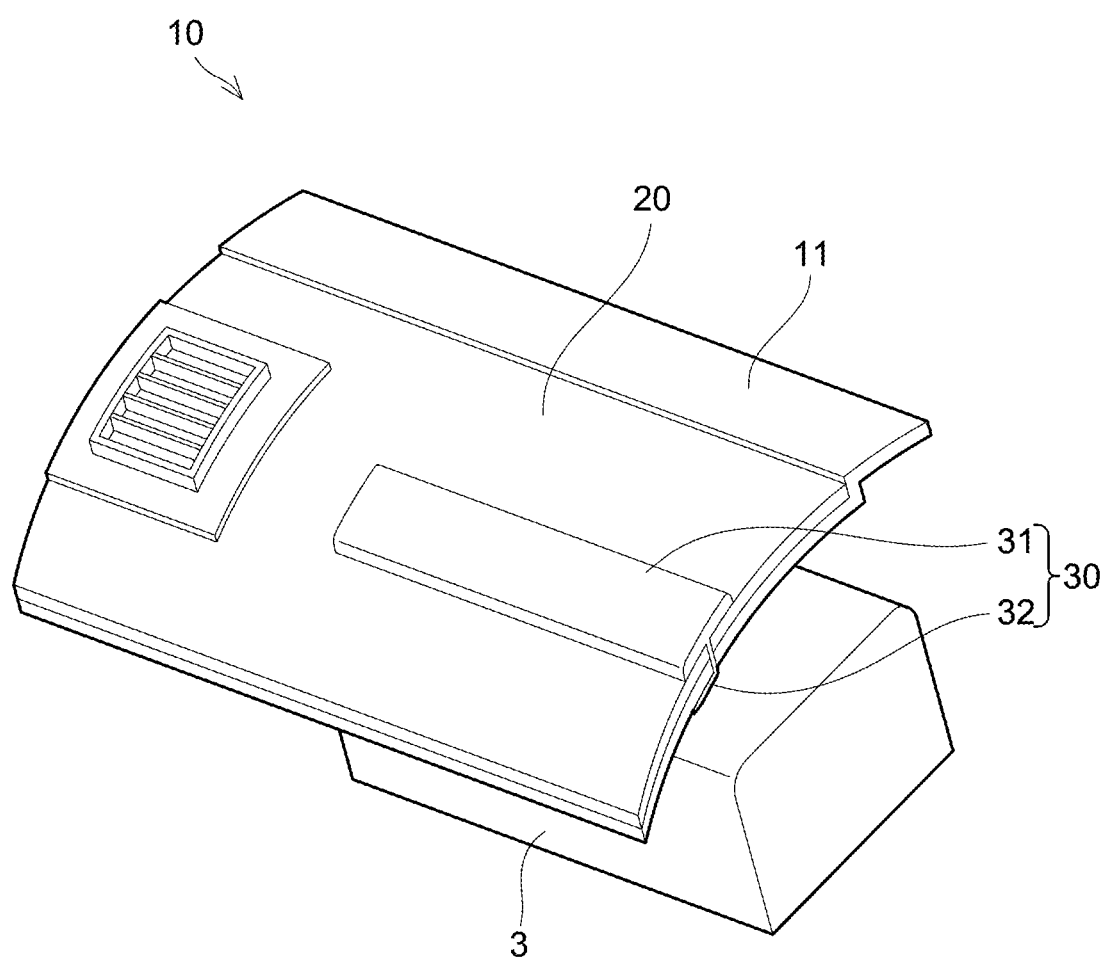
FIG. 2 illustrates an enlarged view of the instrument panel frontward of a front passenger seat.
Figure 3:
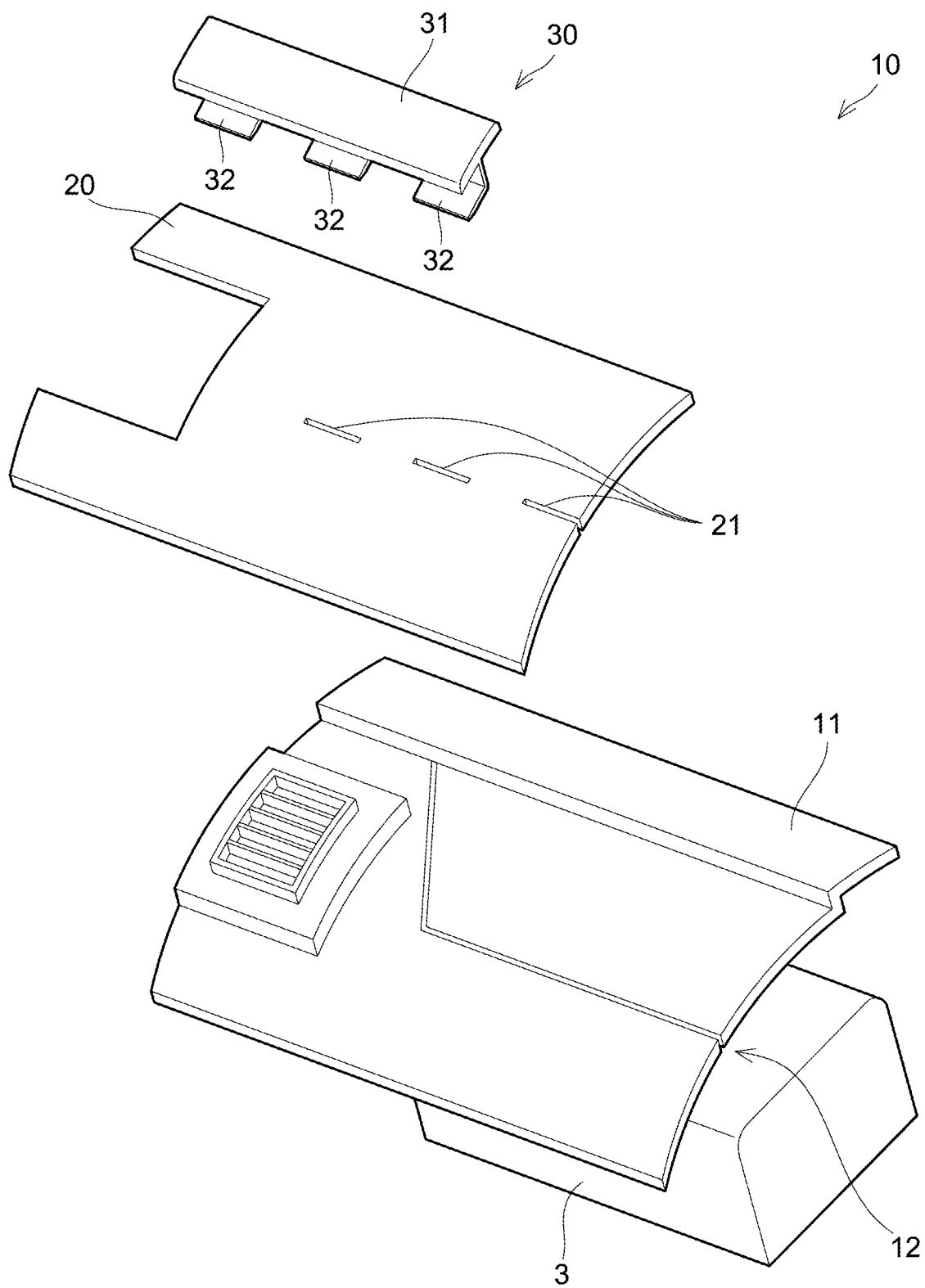
FIG. 3 illustrates a disassembled view of the instrument panel.

The instrument panel 10 covers an airbag 3 (airbag for a front passenger seat) on the front side of the passenger seat 19P. FIG. 2 illustrates an enlarged view of the instrument panel 10 frontward of the front passenger seat 19P. FIG. 3 illustrates a disassembled view of the instrument panel 10 in the area of FIG. 2.

Although the airbag 3 includes a bag body, a case housing the bag body, and an inflater for inflating the bag, the airbag 3 is illustrated in a simplified fashion in FIGS. 2 and 3. Although an airbag door, which opens when the airbag body inflates, is disposed on a top surface of the case, illustration of the airbag door is also omitted. The airbag 3 is supported by an instrument panel crossbeam (instrument panel reinforcement, not illustrated) disposed inside the instrument panel 10. The airbag door may be supported by a back surface of the panel body 11 of the instrument panel 10.

The panel body 11 includes a slit (first slit 12) at a position opposing the airbag 3. The first slit 12 is arranged so that the panel body 11 smoothly opens when the airbag 3 inflates. In other words, when pressed by inflation of the airbag (precisely, by the airbag door), the panel body 11 is split along the first slit 12.

The panel body 11 is partially covered by the decorative sheet 20. The decorative sheet 20 covers an area of the panel body 11 including the first slit 12. The decorative sheet 20 is constituted of at least one of cloth and leather, and disposed to improve appearance of the cabin of the vehicle 2. The decorative sheet 20 also includes slits (second slits 21). As with the first slit 12, the second slits 21 are also arranged so that the decorative sheet 20 smoothly opens when the airbag 3 inflates. When pressed by the inflation of the airbag 3, the decorative sheet 20 is split along the second slits 21.

The second slits 21 are included along the first slit 12. As illustrated in FIG. 3, the plurality of second slits 21 are arranged along one first slit 12.

A central part of the decorative sheet 20 is fastened on the panel body 11 by the fastener 30. The term "central part" refers to a part of the decorative sheet 20 opposing the airbag 3. An edge of the decorative sheet 20 is fastened on the panel body 11 by adhesive. The fastener 30 includes a cover plate 31 covering the second slits 21 and a plurality of anchors 32 extending from the back surface of the cover plate 31 (see FIGS. 2 and 3). FIG. 2 illustrates a vertical cross-section of one of the anchors 32. As is clear from FIGS. 2 and 3, each of the anchors 32 passes through corresponding one of the second slits 21 in the decorative sheet 20 and the first slit 12 in the panel body 11, and is fastened on the panel body 11. The anchors 32 are L-shaped, and respective end portions 32a of the L-shaped anchors are welded to the back surface of the panel body 11.

The cover plate 31 covers the second slits 21 in the decorative sheet 20, by which the second slits 21 become invisible to occupants of the vehicle 2. By virtue of the cover plate 31 hiding the second slits 21, appearance of the decorative sheet 20 can be maintained.

As described above, when the airbag 3 inflates, the panel body 11 splits along the first slit 12, and the decorative sheet 20 splits along the second slits 21. Since the first slit 12 and the second slits 21 through which the anchors 32 of the fastener 30 pass split, the fastener 30 is smoothly detached when the airbag 3 inflates. The fastener 30 does not interfere with the inflation of the airbag 3.

Since the cover plate 31 of the fastener 30 presses the decorative sheet 20 onto the panel body 11, the decorative sheet 20 is not loosened.

The fastener 30 includes the plurality of anchors 32, and each of the anchors 32 passes through corresponding one of the second slits 21 of the decorative sheet 20. The plurality of anchors 32 firmly fastens the decorative sheet 20. Since the decorative sheet 20 includes the plurality of short slits (second slits 21) rather than a long slit, the decorative sheet 20 is less likely to wrinkle.

Figure 4A:
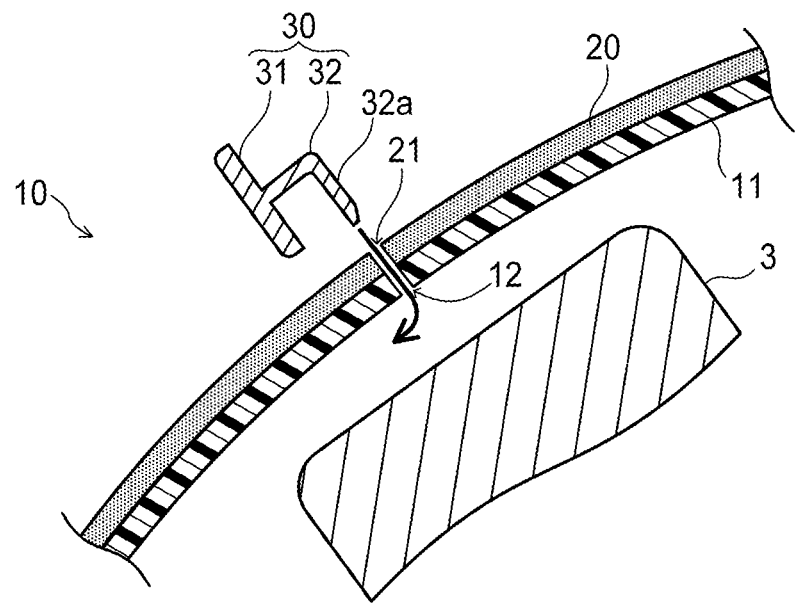
FIG. 4A illustrates a cross-sectional view along a IV-IV line of FIG. 1 (before a fastener is attached).
Figure 4B:
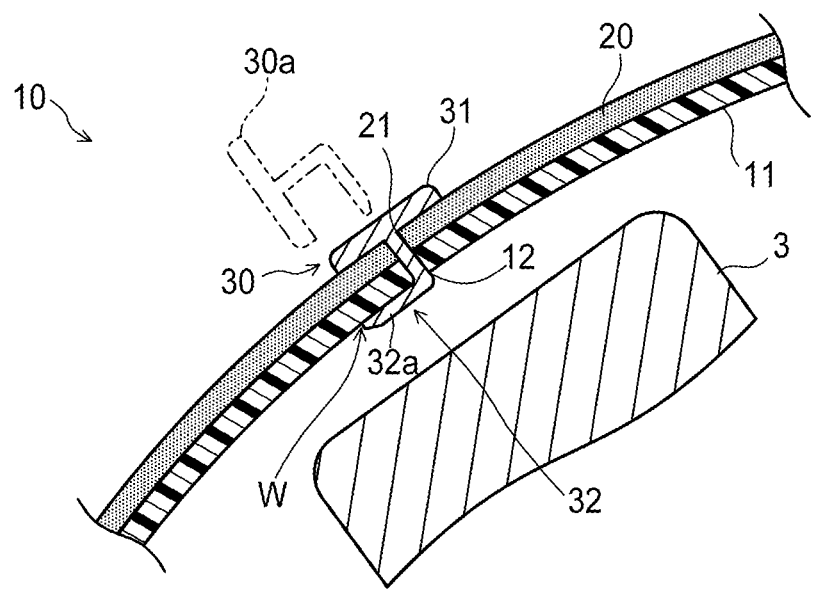
FIG. 4B illustrates the cross-sectional view along the IV-IV line of FIG. 1 (after the fastener is attached).

FIGS. 4A and 4B illustrate a cross-section of the instrument panel 10 along a IV-IV line of FIG. 1. FIG. 4A illustrates the cross-section before the fastener 30 is attached, and FIG. 4B illustrates the cross-section after the fastener 30 is attached. As described above, the anchors 32 of the fastener 30 are L-shaped. As illustrated in FIG. 4A, when each of the anchors 32 is inserted into the corresponding one of the second slits 21 in the decorative sheet 20, the end portion 32a of each L-shaped anchor 32 is placed perpendicular relative to the corresponding one of the second slits 21, and the anchor 32 is inserted into the corresponding one of the second slits 21 (and the first slit 12).

After the anchors 32 are inserted, the fastener 30 is rotated by 90 degrees (see an arrow in FIG. 4A). Then, as illustrated in FIG. 4B, the end portions 32a of the anchors 32 make contact with the back surface of the panel body 11, and the cover plate 31 rests flush against the decorative sheet 20. A broken line 30a of FIG. 4B illustrates the fastener 30 before inserted.

Lastly, the end portions 32a of the anchors 32 are welded to the back surface of the panel body 11. A part indicated by an arrow W of FIG. 4B indicates a welding part. The fastener 30 having the L-shaped anchors 32 can easily be attached and is resistant to being detached.

As described above, by employing the fastener 30 including the cover plate 31 and the anchors 32, the decorative sheet 20 constituted of at least one of leather and cloth can be fastened on the panel body 11 without interfering with the inflation of the airbag 3 or degrading the appearance of the decorative sheet 20.

Figure 5A:
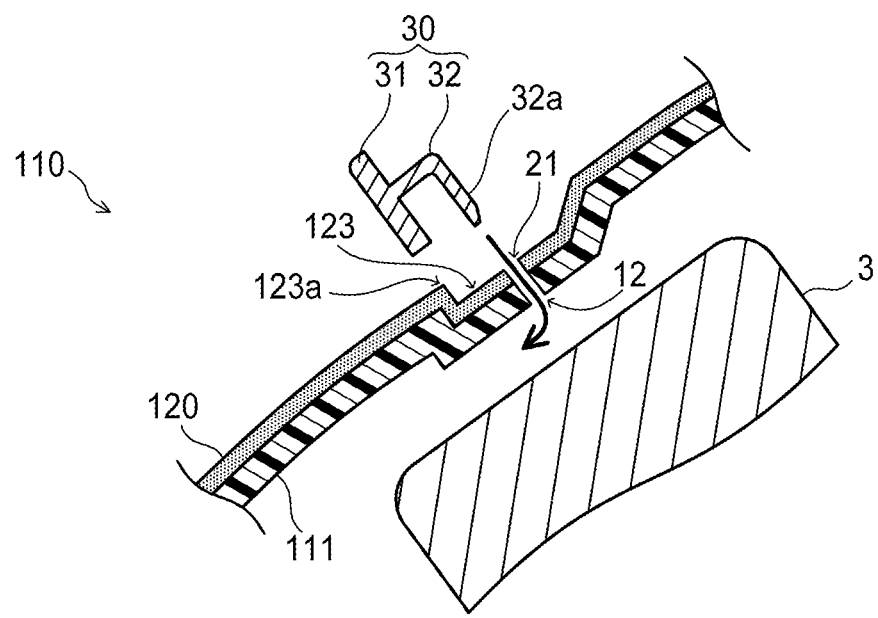
FIG. 5A illustrates a cross-sectional view of an instrument panel of a variant (before a fastener is attached).

An instrument panel 110 of a variant will be explained with reference to FIGS. 5A and 5B. FIG. 5A illustrates a cross-section of the instrument panel 110 before the fastener 30 is attached, and FIG. 5B illustrates a cross-section of the instrument panel 110 after the fastener 30 is attached.

In the instrument panel 110 of the variant, a decorative sheet 120 includes a recess 123 and the second slits 21 are arranged in the bottom of the recess 123. In order to define the recess 123 in the decorative sheet 120, a panel body 111 also includes a recess such that it conforms with the recess 123 in the decorative sheet 120.

The recess 123 includes an edge 123a parallel to a longitudinal direction of the second slits 21. A depth of the recess 123 is the same as a thickness of the cover plate 31 of the fastener 30. The recess 123 has a cross-sectional area greater than that of the cover plate 31 of the fastener 30.

Figure 5B:
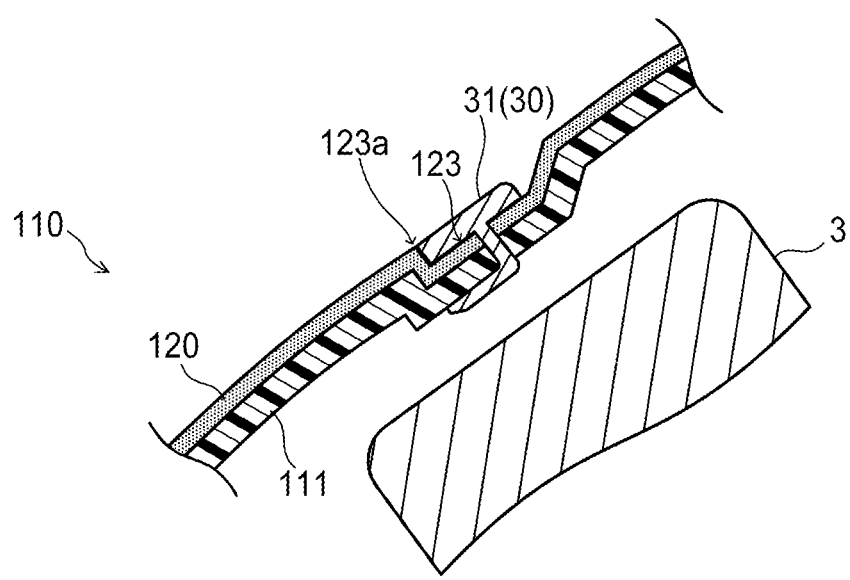
FIG. 5B illustrates a cross-sectional view of the instrument panel of the variant (after the fastener is attached).

The end portion 32a of each anchor 32 of the fastener 30 is inserted into the corresponding one of the second slits 21 (and the first slit 12), and the fastener 30 is rotated by 90 degrees (FIGS. 5A, 5B). As illustrated in FIG. 5B, the cover plate 31 of the fastener 30 fits into the recess 123 in the decorative sheet 120. An edge of the cover plate 31 is adjacent to the edge 123a of the recess 123, by which the decorative sheet 120 becomes flush with the cover plate 31. By virtue of the decorative sheet 120 being flush with the cover plate 31, appearances of the fastener 30 and its vicinity are improved.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. An instrument panel mounted on a vehicle and covering an airbag, the instrument panel comprising:
   a panel body including a first slit at a position opposing the airbag;
   a decorative sheet constituted of at least one of cloth and leather, the decorative sheet covering an area of the panel body including the first slit, and the decorative sheet including at least one second slit arranged along the first slit; and
   a fastener configured to fasten the decorative sheet on the panel body,
   wherein the fastener comprises:
      a cover plate portion configured to cover the at least one second slit, a connecting leg portion extending at a right angle from a back surface of the cover plate portion, and an anchor leg end portion connected to the cover plate portion by the connecting leg portion and extending substantially parallel to the cover plate portion, wherein the anchor leg end portion is configured to be oriented perpendicular relative to the panel body and the decorative sheet when being inserted through the first slit and the at least one second slit, and the fastener is configured to be rotated by 90 degrees after the anchor leg end portion passes through the first slit and the at least one second slit such that the anchor leg end portion is parallel to and in contact with a back surface of the panel body with the connecting leg portion extending through the first slit and the at least one second slit and the cover plate portion resting flush against the decorative sheet.

2. The instrument panel of claim 1, wherein
the fastener comprises a plurality of connecting leg portions and anchor leg end portions extending from the back surface of the cover plate portion.

3. The instrument panel of claim 2, wherein
the at least one second slit includes a plurality of second slits, and
each of the plurality of connecting leg portions passes through a corresponding one of the plurality of second slits.

4. The instrument panel of claim 1, wherein the anchor leg end portion is welded to the back surface of the panel body.

* * * * *